US008307217B2

(12) United States Patent
Lee et al.

(10) Patent No.: US 8,307,217 B2
(45) Date of Patent: Nov. 6, 2012

(54) TRUSTED STORAGE

(76) Inventors: Lane W. Lee, Boulder, CO (US); Mark J. Gurkowski, Longmont, CO (US); Randal Hines, Boulder, CO (US)

( * ) Notice: Subject to any disclaimer, the term of this patent is extended or adjusted under 35 U.S.C. 154(b) by 1268 days.

(21) Appl. No.: 12/025,777

(22) Filed: Feb. 5, 2008

(65) Prior Publication Data
US 2008/0294914 A1    Nov. 27, 2008

Related U.S. Application Data

(60) Provisional application No. 60/888,004, filed on Feb. 2, 2007, provisional application No. 60/940,191, filed on May 25, 2007, provisional application No. 60/954,759, filed on Aug. 8, 2007.

(51) Int. Cl.
G06F 12/14    (2006.01)
H04L 9/08     (2006.01)

(52) U.S. Cl. .......................................... 713/193; 380/281
(58) Field of Classification Search .................. 713/193; 380/281
See application file for complete search history.

(56) References Cited

U.S. PATENT DOCUMENTS

| 5,778,068 | A  | * | 7/1998  | Johnson et al. ............... 713/189 |
| 6,081,893 | A  | * | 6/2000  | Grawrock et al. ............. 713/183 |
| 6,438,235 | B2 | * | 8/2002  | Sims, III ....................... 380/285 |
| 6,550,011 | B1 | * | 4/2003  | Sims, III ....................... 713/193 |
| 6,826,690 | B1 | * | 11/2004 | Hind et al. ..................... 713/186 |
| 7,110,982 | B2 | * | 9/2006  | Feldman et al. ................ 705/51 |
| 7,159,120 | B2 | * | 1/2007  | Muratov et al. ............... 713/182 |
| 7,373,517 | B1 | * | 5/2008  | Riggins ......................... 713/184 |
| 7,549,044 | B2 | * | 6/2009  | Lee et al. ....................... 713/167 |
| 7,599,493 | B2 | * | 10/2009 | Sandhu et al. .................. 380/44 |
| 2003/0123670 | A1 | * | 7/2003 | Shimada et al. ............... 380/281 |
| 2005/0262361 | A1 |   | 11/2005 | Thibadeau |
| 2006/0174352 | A1 |   | 8/2006  | Thibadeau |
| 2007/0022285 | A1 |   | 1/2007  | Groth et al. |
| 2007/0061561 | A1 |   | 3/2007  | Hashiguchi |
| 2008/0155276 | A1 | * | 6/2008 | Chen et al. .................... 713/193 |
| 2008/0240428 | A1 | * | 10/2008 | Hobbet et al. ................. 380/45 |

FOREIGN PATENT DOCUMENTS

WO    WO 2007/121587    * 11/2007

OTHER PUBLICATIONS

PCT Search Report PCT/US08/64923, Aug. 11, 2008, DPHI.

* cited by examiner

*Primary Examiner* — Saleh Najjar
*Assistant Examiner* — Shu Chun Gao

(57) ABSTRACT

In one embodiment, a method for authenticating access to encrypted content on a storage medium, wherein the encrypted content is encrypted according to a full disk encryption (FDE) key, the storage medium including an encrypted version of the FDE key and an encrypted version of a protected storage area (PSA) key, and wherein the encrypted version of the FDE key is encrypted according to the PSA key, the method comprising: providing an authenticated communication channel between a host and a storage engine associated with the storage medium; at the storage engine, receiving a pass code from the host over the authenticated communication channel; hashing the pass code to form a derived key, wherein the encrypted version of the PSA key is encrypted according to the derived key; verifying an authenticity of the pass code; if the pass code is authentic, decrypting the encrypted version of the PSA key to recover the PSA key; decrypting the encrypted FDE key using the recovered PSA key to recover the FDE key; and decrypting the encrypted content using the FDE key.

18 Claims, 3 Drawing Sheets

TRUSTED STORAGE

RELATED APPLICATIONS

This application claims the benefit of U.S. Provisional Application No. 60/888,004, filed Feb. 2, 2007, U.S. Provisional Application No. 60/940,191, filed May 25, 2007, and U.S. Provisional Application No. 60/954,759, filed Aug. 8, 2007. The contents of these three applications are incorporated by reference in their entirety.

TECHNICAL FIELD

The present invention relates generally to digital rights management. More particularly, the present invention relates to the secure access of storage mediums.

BACKGROUND

Developments in the field of digital rights management (DRM) have accelerated as the proliferation of peer-to-peer file sharing services on the Internet exacerbate the conflict between digital content creators and digital content users. Much digital content such as financial records or medical records is extremely private yet has to be shared with the appropriate users. Transmission of such private digital content over the Internet is problematic even when the content is encrypted given the ever-increasing skills of "hackers."

Trusted computing is a development that addresses security concerns. Trusted computing describes trust in terms of consistency: an entity can be trusted when it always behaves in the expected manner for the intended purpose. A trusted entity is necessarily secure from unauthorized access so that specified, expected behavior cannot be manipulated. Furthermore, trust can be transitive—it can be extended from one entity to another within a trusted computing protocol.

Trusted computing experts generally agree that trust should be rooted with a hardware component. Software, while an important component in trusted computing, is inadequate by itself because the flexibility of software makes it difficult to protect. The barrier to mount a software-only attack is lower than an attack that involves hardware. Attacks on hardware require significant skill and specialized hardware whereas software-only attacks are limited primarily by the intellectual skills of the hacker. Moreover, as hardware becomes increasingly more sophisticated, this dichotomy between software-only attacks vs. attacks that involve hardware becomes exacerbated. Furthermore, software-only attacks can be automated and thus executed without detailed system knowledge and/or distributed over networks.

All computing systems typically need association with storage devices. For a trusted computing system, storage devices have two roles. Both roles involve serving as a repository of sensitive information. The first role is traditional and more passive—the storage device makes no distinction between sensitive and non-sensitive information. Operating systems and software applications thus manage all aspects of security and trust for such storage devices. A second role for storage devices in trusted computing systems is more active such that the storage device is a direct participant in trusted computing. In this manner, a boundary of trust can be extended to include the storage device, thereby creating new trust and security capabilities for the resulting trusted computing system.

As a direct participant in trusted computing, a storage device is primarily concerned with access control and confidentiality. Access control is a mechanism that permits only authorized entities to access resources whereas confidentiality is keeping information secret. Paramount to establishing access control is entity authentication, a mechanism that assures a storage device of a client's identification. Accordingly, there is a need in the art for storage devices having improved entity authentication and confidentiality capabilities.

SUMMARY

In accordance with one aspect of the invention, a method for authenticating access to encrypted content on a storage medium, wherein the encrypted content is encrypted according to a full disk encryption (FDE) key, the storage medium including an encrypted version of the FDE key and an encrypted version of a protected storage area (PSA) key, wherein the encrypted version of the FDE key is encrypted according to the PSA key, the method comprising:

providing an authenticated communication channel between a host and a storage engine associated with the storage medium;

at the storage engine, receiving a pass code from the host over the authenticated communication channel;

hashing the pass code to form a derived key, wherein the encrypted version of the PSA key is encrypted according to the derived key;

verifying an authenticity of the pass code, the storage engine thereby authenticating a user associated with the pass code;

and if the pass code is authentic, decrypting the encrypted version of the PSA key to recover the PSA key;

decrypting the encrypted FDE key using the recovered PSA key to recover the FDE key; and decrypting the encrypted content using the FDE key.

These and other aspects of the invention will become more apparent from the following drawings and description.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

A storage device or drive associates with a storage medium that stores content written to the storage medium by a host device through the storage drive. A conventional example would be a host PC incorporating an optical disk drive or a magnetic hard drive. Optical disk drives are particularly advantageous in that optical storage medium is relatively cheap yet offers substantial storage capacity. In particular, optical disk drives and associated formats such as CD-RW, DVD, HD-DVD, and Blu-ray all have the additional advantage of enabling the user to remove the disks. However, it will be understood that the principles discussed herein may be widely applied to any type of storage device such as a magnetic hard drive, FLASH drive, or other suitable devices.

Figure 1:
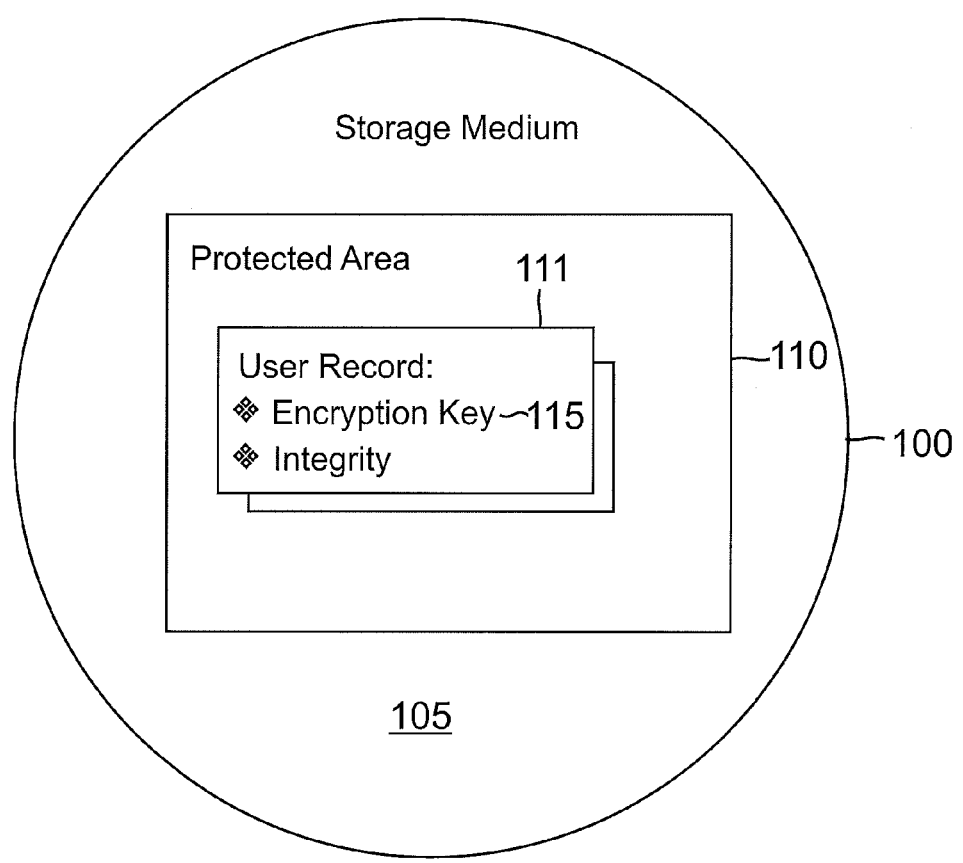
FIG. 1 is a block diagram of an example storage medium.

Turning now to FIG. 1, an overview of an example storage medium 100 is illustrated. With regard to a trusted storage drive, medium 100 includes a user area 105 that may contain both protected and unprotected content. Advantageously, medium 100 may be physically identical to a standard storage medium such as a DVD, CD-RW, HD-DVD, or other types of optical disks. However, as will be explained further herein, a host device may be authenticated to a trusted drive so as to establish an authenticated communication channel between the host and the drive. Given this authenticated host, a user or other entity may then authenticate itself to the drive through the authenticated communication channel. The latter entity authentication may also be denoted as a "log on" to distinguish it from the necessary host authentication. Given these two events, trust has been established between the host and the drive such that the drive will access security information in a secure provider (SP) area 110. Parts of the SP area may be encrypted as will be explained further herein. Each user associates with its own user record 111 in the SP area. If there is a plurality of users, there is thus a plurality of user records in SP area 110.

During log on, a user provides a pass code, which may be variable in length or have a fixed length. A pass code may be as simple as an alphanumeric name such as "username1" or it may be more sophisticated such as a code derived from a biometric scanner. Alternatively, a pass code may be a machine-provided code as provided by the host or from devices networked with the host such as a server. The trusted disk drive processes the user's pass code through a hash function such as, for example, the National Security Agency (NSA) SHA-256 hash to create a corresponding derive key (DK) 115. It will be appreciated that other types of hash functions may also be used. It may thus be seen that each user associates (upon presentation of the appropriate pass code) with its own DK. Within each user record, certain elements such as an identification of the user are unencrypted. Thus, a user on a host device may peruse the list of available users without having performed a log on. A user, having selected the appropriate record associated with the user's name, may then log on by providing the corresponding pass code to the disk drive. The disk drive will then process the pass code to uncover the corresponding DK. Portions of each user record are encrypted according to the corresponding DK. Thus, the disk drive may then decrypt the encrypted portions of the user record using the DK to provide an un-encrypted user record. Because a user record is at least partially encrypted, as used herein "user record" without a qualifier such as "un-encrypted user record" refers to the partially-encrypted user record. Each user record includes an integrity check, which may also be denoted as an entity authentication code (EAC). For example, the pass code and/or also other factors in the user record may be hashed using, for example, the SHA-256 hash function to generate an EAC. This EAC is encrypted and forms part of the user record. Upon decryption of the user record, the pass code and other recovered user record entries may then be hashed and the result compared to the decrypted EAC entry. If these entries match, the user's authenticity is verified. If the integrity check matches, then the log on is completed such that the disk drive considers the user authenticated.

In one embodiment, the user area is entirely encrypted according to a full disk encryption (FDE) key such as a 128-bit or 256 bit-Advanced Encryption Standard (AES) key. This FDE key is encrypted within the SP. Each user record includes a protected storage area (PSA) key that decrypts the encrypted FDE key. Each user record's PSA key is encrypted by the corresponding DK such as through 128-bit or 256-bit AES. It will be appreciated, however, that other encryption protocols may also be used. Thus, it may be seen that each user record's encrypted PSA key is unique to that record. Upon authentication of a user, the disk drive has access to the un-encrypted PSA key (which may be seen to be the same for all user records) so that the FDE key may be recovered by decrypting the encrypted FDE key using the PSA key. At this point, the disk drive may then perform "on-the-fly" protected reads to the user area as well as protected writes to the user area using the FDE key.

Note the advantages of such an entity authentication and security protocol: a user may only access the protected content in the user area if they know the pass code. The pass code is not stored on the disk so that unless appropriate credentials are presented (a pass code received from an authenticated host), the SP area cannot be decrypted. In other words, no keys are stored in firmware with the storage drive. Users are thus protected from unauthorized accesses. Of course, such security is thus hinging on the protection of the pass code by a given user. To bolster security, an N-factor authentication procedure will be further explained herein.

Figure 2:
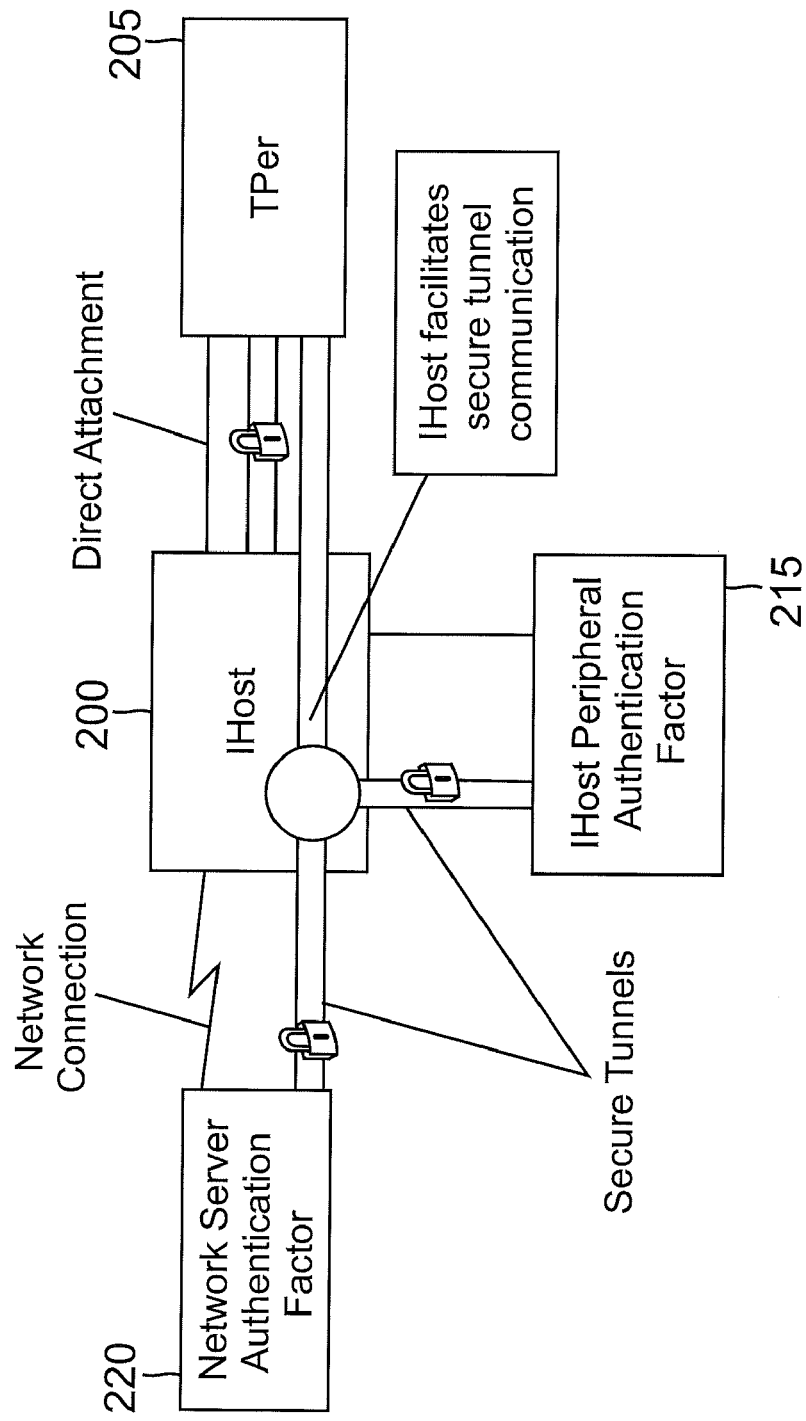
FIG. 2 illustrates the entities in an N-factor authentication scheme.

Turning now to FIG. 2, the communication paths for an N-factor authentication is illustrated. A host 200 communicates with a trusted drive 205 through, for example, a direct attachment. Host 200 and drive 205 authenticate each other through an authentication protocol such as using public/private keys or other suitable authentication protocols. Having authenticated each other, the communication channel between drive 205 and 200 may be referred to as a secure channel. As discussed earlier, a user on host may review the user records associated with the storage medium associated with drive 205 such that the user responds to a particular user record by attempting to log on. As part of this log on, the user provides a pass code such as, for example, "username1." However, this single pass code is not sufficient in an N-factor authentication protocol, where N is a plural integer representing the total number of pass codes associated with a particular user record. These additional pass codes may be obtained, for example, from a USB drive dongle 215 and/or a network server 220 that may also communicate with host 200 through authenticated channels. Drive 205 then creates a single derive key from these N resulting pass codes as discussed further with regard to the process shown in FIG. 3.

Figure 3:
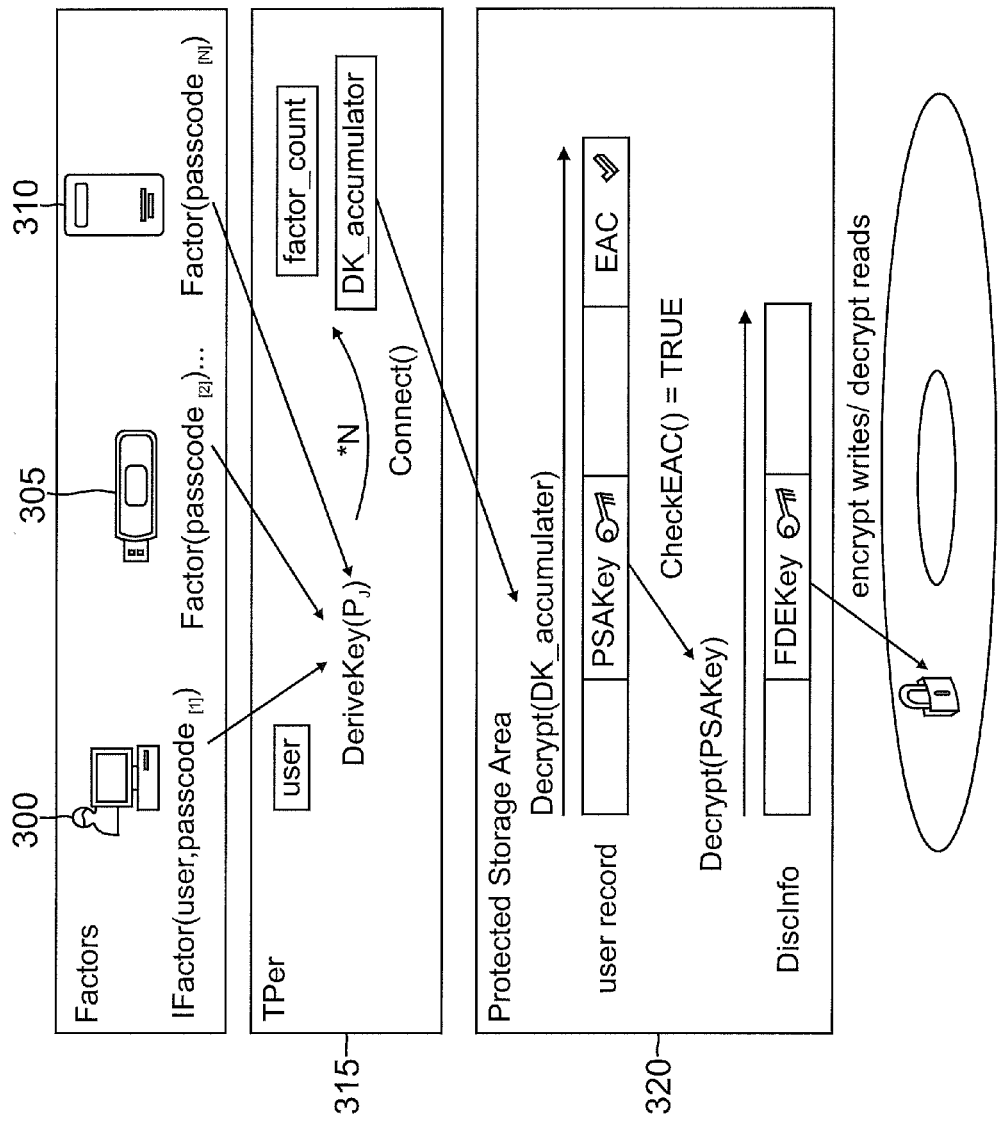
FIG. 3 illustrates the steps in the N-factor authentication scheme of FIG. 2.

As seen in FIG. 3, the various factors such as entered by a user 300, a USB Flash dongle 305, and from a network server 310 are provided to the storage engine 315. In one embodiment, each pass code factor is hashed using a National Security Agency (NSA) hash function such as SHA-256 to create a corresponding derive key factor. The designation "factor" may also be replaced with the corresponding integer for the particular factor (from 1 to N for the various factors). These N factors are then combined such as through a logical XOR operation so as to produce a final DK, which may be designated as DK_accumulator to denote its result from a combination of the various derive key factors. Having thus recovered the ultimate DK, the disk drive may use it to decrypt the encrypted entries in the user record within a protected storage area in SP 320. If the integrity check matches, the user is thereby authenticated. The PSA key in the user record, having been decrypted by the DK_accumulator, may then be used by the disk drive to recover the FDE key. As compared to a single factor authentication scheme, such an N-factor authentication protocol is more robust in that, for example, suppose an unauthorized individual has gained access to the pass code. Unless that user also has the appropriate USB dongle as well as a host that may associate with the server (according to the example embodiment of FIG. 2), the mere possession of a single pass code is insufficient to be authenticated to the SP.

The user records in the SP may be organized as rows with the columns corresponding to the various fields in each user record. For example, one field may be an un-encrypted user name that a host may read so as to determine which user record it would like to log on. Another field may correspond to an authority level for a user. For example, in an initial loading of a medium into a storage device, the user records are blank. A user need merely present itself to the drive through an authenticated channel so as to create a user record. The drive may include a random number generator to create the FDE and PSK keys for this initial user. Any other users who would like to be added to the user records must then have permission from an existing user—it may thus be seen that one or more users may be given the authority to allow additional users to have corresponding user record entries. The authority level indicates this authority, which need not be an encrypted field. Encrypted fields include the PSA key and the EAC.

The above-described embodiments of the present invention are merely meant to be illustrative and not limiting. For example, the term "storage engine" will be understood to include the hardware necessary to read and write from the storage medium as well as the intelligence for the implementation of the digital rights management described herein. It will thus be obvious to those skilled in the art that various changes and modifications may be made without departing from this invention in its broader aspects. The appended claims encompass all such changes and modifications as fall within the true spirit and scope of this invention

What is claimed is:

1. A method for authenticating access to an encrypted content on a storage medium, wherein the encrypted content is encrypted according to a full disk encryption (FDE) key, the storage medium including an encrypted version of the FDE key and an encrypted version of a protected storage area (PSA) key, and wherein the encrypted version of the FDE key is encrypted according to the PSA key, the method comprising:
providing an authenticated communication channel between a host and a storage engine associated with the storage medium;
at the storage engine, receiving a pass code from the host over the authenticated communication channel;
at the storage engine, hashing the received pass code to form a derived key, wherein the encrypted version of the PSA key is encrypted according to the derived key;
at the storage engine, verifying an authenticity of the received pass code;
if the received pass code is authentic, decrypting the encrypted version of the PSA key to recover the PSA key at the storage engine;
at the storage engine, decrypting the encrypted FDE key using the recovered PSA key to recover the FDE key; and
at the storage engine, decrypting the encrypted content using the FDE key;
wherein verifying the authenticity includes hashing a corresponding pass code associated with the user record to generate an entity authentication code (EAC), encrypting the EAC, storing the encrypted EAC in a user record on the storage medium, and hashing the received pass code, decrypting the stored encrypted EAC to recover the EAC, and comparing the hashed received pass code to the EAC.

2. The method of claim 1, wherein providing an authenticated communication channel further comprises:
the host authenticating the storage engine through a first authentication protocol using a first public key or a first private key; and
the storage engine authenticating the host through a second authentication protocol using a second public key or a second private key.

3. The method of claim 1, wherein receiving a pass code further comprises:
selecting a user record;
associating the received pass code with the user record; and
processing the received pass code to uncover the derived key associated to the user record, wherein the user record is one of a plurality of user records and the derived key associated with the user record is unique to the user record associated with the received pass code.

4. The method of claim 1, wherein hashing the received pass code to form a derived key further comprises:
associating a user record on the storage medium with the received pass code;
and storing the derived key-encrypted version of the PSA key in the user record associated with the received pass code.

5. The method of claim 1, wherein decrypting the encrypted version of the PSA key to recover the PSA key further comprises:
recovering the derived key using the received pass code; associating a user record on the storage medium to the received pass code; and
using the derived key to decrypt the encrypted version of the PSA key stored in the user record associated with the pass code, wherein the user record is one of a plurality of user records and the encrypted version of the PSA key is unique to the user record associated with the pass code.

6. The method of claim 1, wherein decrypting the encrypted FDE key using the recovered PSA key to recover the FDE key further comprises:
accessing the encrypted FDE key in a secure provider (SP) area, wherein the SP area stores at least one user record.

7. The method of claim 1, further comprising using the recovered FDE key to encrypt content and store the encrypted content on the storage medium.

8. The method of claim 1, wherein a derived key associated to a user record is generated using a National Security Agency (NSA) secure hash algorithm (SHA) hash of a pass code associated to the user record.

9. The method of claim 1, wherein:
a derived key associated with a user record is generated using a National Security Agency (NSA) secure hash algorithm (SHA) hash of a pass code associated to a user record;
the encrypted version of the PSA key is encrypted by the derived key associated to the user record through an advanced encryption standard (AES); and
the AES, derived key-encrypted version of the PSA key is stored in the user record in a secure provider (SP) area.

10. The method of claim 1, wherein verifying an authenticity of the received pass code further comprises using an N-factor authentication protocol including a plurality of factors.

11. A system comprising:

a storage medium for storing digital content, including: a secure provider (SP) area storing one or more user records and an encrypted version of a full disk encryption (FDE) key; wherein: at least one user record stores an encrypted version of a protected storage area (PSA) key; the encrypted version of the FDE key is encrypted according to the PSA key; and a digital content on the storage medium is encrypted according to the FDE key;

a storage engine for reading and writing the digital content on the storage medium, and configured to: hash a pass code associated with a user record to generate a derived key associated with the user record; encrypt the PSA key according to the derived key; and store the derived key-encrypted version of the PSA key in the user record associated with the pass code;

a host device configured to communicate with the storage engine, wherein a logon includes selecting a user record and providing a pass code associated with the user record; and a communication channel between the host and the storage engine, wherein: the host and the storage engine authenticate each other via the communication channel to provide an authenticated communication channel; and an authenticated logon via the authenticated communication channel provides access to the FDE encrypted content on the storage medium, wherein the authenticated logon includes hashing the pass code to generate an entity authentication code (EAC), encrypting the EAC, storing the encrypted EAC in the user record associated with the pass code; and verifying an authenticity of the provided pass code, including hashing the provided pass code, decrypting the stored encrypted EAC to recover the EAC, and comparing the hashed provided pass code to the EAC.

12. The system of claim 11, wherein the authenticated logon provides access to the FDE encrypted content in the SP area on the storage medium.

13. The system of claim 11, wherein the authentication of the communication channel comprises:

the host authenticating the storage engine through a first authentication protocol using a first public key or a first private key; and the storage engine authenticating the host through a second authentication protocol using a second public key or a second private key.

14. The system of claim 11, wherein the user record is one of a plurality of user records and the derived key associated to the user record is unique to the user record associated with the received pass code.

15. The system of claim 11, wherein the user record is one of a plurality of user records and the encrypted version of the PSA key is unique to the user record associated with the received pass code.

16. The system of claim 11, wherein the authenticated logon comprises:

processing the provided pass code of the selected user record to uncover the derived key associated with the selected user record.

17. The system of claim 11, wherein provision of access to the FDE encrypted content on the storage medium comprises:

recovering the PSA key by decrypting the derived key-encrypted version of the PSA key from the selected user record associated with the provided pass code, including:

recovering the derived key using the provided pass code; and using the derived key to decrypt the encrypted version of the PSA key stored in the selected user record;

recovering the encrypted FDE key using the recovered PSA key; and using the FDE key to encrypt content for writing to the storage medium or decrypt content for reading from the storage medium.

18. The system of claim 11, wherein the derived key associated to the user record in generated using a National Security Agency (NSA) secure hash algorithm (SHA) hash of the pass code associated to the user record.

* * * * *